(12) United States Patent
Ganesh et al.

(10) Patent No.: US 7,698,695 B2
(45) Date of Patent: Apr. 13, 2010

(54) SEARCH TECHNIQUE FOR DESIGN PATTERNS IN JAVA SOURCE CODE

(75) Inventors: Sarvani Ganesh, Bangalore (IN); Kallol Pal, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1258 days.

(21) Appl. No.: 11/214,526

(22) Filed: Aug. 31, 2005

(65) Prior Publication Data

US 2007/0050358 A1 Mar. 1, 2007

(51) Int. Cl.
G06F 9/45 (2006.01)
G06F 9/44 (2006.01)

(52) U.S. Cl. .................... 717/143; 717/144; 717/106

(58) Field of Classification Search .............. 717/143, 717/144
See application file for complete search history.

(56) References Cited

U.S. PATENT DOCUMENTS

| | | | | |
|---|---|---|---|---|
| 5,488,714 | A * | 1/1996 | Skidmore | 717/143 |
| 5,619,718 | A * | 4/1997 | Correa | 704/9 |
| 6,078,743 | A | 6/2000 | Apte et al. | |
| 6,237,135 | B1 | 5/2001 | Timbol | |
| 6,343,376 | B1 * | 1/2002 | Saxe et al. | 717/154 |
| 6,851,105 | B1 * | 2/2005 | Coad et al. | 717/106 |
| 7,051,299 | B2 * | 5/2006 | Chadha et al. | 716/4 |
| 7,188,335 | B1 * | 3/2007 | Darr et al. | 717/121 |
| 7,225,188 | B1 * | 5/2007 | Gai et al. | 707/6 |
| 7,526,753 | B2 * | 4/2009 | Spencer et al. | 717/109 |
| 2003/0069908 | A1 * | 4/2003 | Anthony et al. | 707/513 |
| 2004/0187093 | A1 * | 9/2004 | Hogan | 717/114 |
| 2005/0005261 | A1 * | 1/2005 | Severin | 717/108 |
| 2005/0022115 | A1 * | 1/2005 | Baumgartner et al. | 715/513 |
| 2005/0108554 | A1 * | 5/2005 | Rubin et al. | 713/187 |
| 2005/0165724 | A1 * | 7/2005 | West | 707/1 |
| 2005/0166193 | A1 * | 7/2005 | Smith et al. | 717/143 |
| 2005/0262056 | A1 * | 11/2005 | Hamzy et al. | 707/3 |
| 2006/0265697 | A1 * | 11/2006 | Ali et al. | 717/141 |

OTHER PUBLICATIONS

"Breadth-First Search" Wikipedia Definition, pp. 1-2, Mar. 29, 2004, "http://web.archive.org/web/20040329012334/http://en.wikipedia.org/wiki/Breadth-first_search".*

(Continued)

Primary Examiner—Wei Y Zhen
Assistant Examiner—Chih-Ching Chow
(74) Attorney, Agent, or Firm—George R. McGuire; David B. Woycechowsky; Bond, Schoeneck & King, PLLC (57) ABSTRACT

The present invention is directed to a computerized method for identifying at least one pattern in source code. The method includes the step of parsing the source code to obtain data corresponding to at least one source code class. A plurality of search units are provided, each search unit being configured to evaluate a single verifiable property of the at least one source code class to a TRUE state or a FALSE state. At least a portion of the plurality of search units are arranged in at least one predetermined search sequence. The at least one source code class is evaluated by each search unit included in the at least one predetermined sequence.

9 Claims, 7 Drawing Sheets

OTHER PUBLICATIONS

Erich Gamma, Richard Helm, Ralph Johnson, and John Vlissides. "Design Patterns: Elements of reusable object-oriented software." 1995, Addison-Wesley, entire book.*

Min Song and Il-Yeol Song & Peter P. Chen, Design and Development of a Cross Search Engine for Multiple Heterogeneous Database Using UML and Design Patterns; 2004 Kluwer Academic Publishers.

Jochen Seemann and Jurgen Wolff Von Gudenburg, Pattern Based Design Recovery of Java Software, 1998.

Amir Michail, Browsing and Searching Source Code of Applications written using a GUI Framework, 2002.

Brian S. Mitchell, Spiros Mancoridis and Martin Traverso, Search Based Reverse Engineering, 2002.

INSPEC Abstract, "Techniques and Patterns for Designing Business Operations in EJB", Ji Hwan Park et al., Journal of KISS, Feb. 2003, vol. 30.

INSPEC Abstract, "Automatic Design Patterns Identification of C++ Programs", FAC Espinoza et al., EurAsia-ITC 2002, Information and Communication Technology, EurAsian Conference Proceedings, Shiraz, Iran, Oct. 2002.

INSPEC Abstract, "Automating Design-Pattern Identification", Bansiya J., Dr. Dobb's Journal, vol. 23, No. 6, Jun. 1998.

INSPEC Abstract, "Design Reverse-Engineering Using Design Patterns", Domajnko T.,et al., Uporabna Informatika, vol. 8, No. 4, Oct.-Dec. 2000.

* cited by examiner

```
<PatternTree>
<Rule> dummy_rule
    <Rule> IsAClass
        <Rule>Public_Static_Method_Return_Same_Class
            <Rule>Private_Constructor
                <Rule>Private_Static_Member_Variable
                    <Rule>Constructor_Invoked_Once <Pattern> Singleton
                        </Pattern>

</Rule>
                </Rule>
            <Rule>Protected_Constructor
                <Rule>Protected_Static_Member_Variable
                    <Rule>Constructor_Invoked_Once <Pattern> Singleton
                        </Pattern>

</Rule>
                </Rule>
            </Rule>
        </Rule>
    </Rule>
</Rule>
<PatternTree>
```

FIG.4

```
<Rule> IsAClass
    <RuleDescription> The file being evaluated is a class
    </RuleDescription>
    <Validator> com.ibm.dp.validator.ClassValidator
    </Validator>
</Rule>
<Rule> Public_Static_Method_Return_Same_Class
    <RuleDescription> Class has a public static method with return type same as the class
    </RuleDescription>
    <Validator> com.ibm.dp.validator.SameClassReturnValidator
    </Validator>
</Rule>
<Rule> Private_Constructor
    <RuleDescription> Class has only private constructors
    </RuleDescription>
    <Validator> com.ibm.dp.validator.PrivateConstructorValidator
    </Validator>
</Rule>
<Rule> Constructor_Invoked_Assigned_Once
    <RuleDescription> Constructor should be invoked only once through out the class and assigned to the
    </RuleDescription>
    <Validator> com.ibm.dp.validator.ConstructorInvocationValidator
    </Validator>
</Rule>
```

FIG.5

```
<DPRules>
  <Rules>
    <Rule> IsAClass
    <RuleDescription> The file being evaluated is a class
    </RuleDescription>
    <Validator> com.ibm.dp.validator.ClassValidator
    </Validator>
    </Rule>
    <Rule> Public_Static_Method_Return_Same_Class
    <RuleDescription> Class has a public static method with return type same as the class
    </RuleDescription>
    <Validator> com.ibm.dp.validator.SameClassReturnValidator
    </Validator>
    </Rule>
    <Rule> Private_Constructor
    <RuleDescription> Class has only private constructors
    </RuleDescription>
    <Validator> com.ibm.dp.validator.PrivateConstructorValidator
    </Validator>
    </Rule>
    <Rule> Constructor_Invoked_Assigned_Once
    <RuleDescription> Constructor should be invoked only once through out the class and assigned to the
    </RuleDescription>
    <Validator> com.ibm.dp.validator.ConstructorInvocationValidator
    </Validator>
    </Rule>
  </Rules>
```

FIG.6A

```
<PatternTree>
<Rule> dummy_rule
    <Rule> IsAClass
        <Rule>Public_Static_Method_Return_Same_Class
            <Rule>Private_Constructor
                <Rule>Private_Static_Member_Variable
                    <Rule>Constructor_Invoked_Once
                        <Pattern> Singleton
                        </Pattern>
                    </Rule>
                </Rule>
            <Rule>Protected_Constructor
                <Rule>Protected_Static_Member_Variable
                    <Rule>Constructor_Invoked_Once
                        <Pattern> Singleton
                        </Pattern>
                    </Rule>
                </Rule>
            </Rule>
        </Rule>
</PatternTree>
```

FIG. 6B

SEARCH TECHNIQUE FOR DESIGN PATTERNS IN JAVA SOURCE CODE

BACKGROUND OF THE INVENTION

1. Field of the Invention

The present invention relates generally to data processing, and particularly to reusing code in software development.

2. Technical Background

The JAVA programming language (herein sometimes called "JPL") is an object-oriented programming language that was specifically designed by Sun Microsystems for use in a distributed computing environment. (The term JAVA may be subject to trademark rights.) Accordingly, JPL based applications may run on a single computer or be distributed among server computers and client computers in a network. As long as the computer has a JPL virtual machine, the program can run on that computer. JPL is also used to write small applications commonly referred to as "applets." Applets are often provided to a client computer along with a web page. The JPL applet may perform the various functions that allow a user to interact with the web page somewhat independently from the server computer.

Computer programs have traditionally been action oriented and were written to implement a method or procedure. The method processed the input data to generate output data. Object-Oriented programming, on the other hand, models data to identify the objects that are to be manipulated and determine how the objects interrelate. Accordingly, there is a data hierarchy consisting of types, classes, and objects. Generally speaking there are two data types, primitive data and classes. Primitive data includes simple entities such as numbers and characters. Data classes are typically more complex and are user-defined to represent things other than numbers and characters. In Object-Oriented programming terminology, an object is referred to as an instance of a class. In other words, if "customer" represents the class, then a particular customer, "John Smith," would be an object within the customer class.

Each class is defined as having attributes. For example, the customer class may include attributes such as last name, first name, address, email address, telephone number, financial data, and etc. While every object in the class may include all of these attributes, each object will typically have different values associated with the attributes. A class may have one or more "behaviors" associated with it. A behavior is a method that may be performed by the objects within the class. An object may call its own methods, or may call another object's methods, if that object is visible. An 'object is created within the class by a method known as a constructor. The JPL virtual machine will assign the newly created object a reference identifier that uniquely identifies the object within the virtual machine. An object may communicate with another object by transmitting a message. In the message, the first object may provide data and invoke a method resident in the target object. The target object will execute the method using the data provided, and return a value to the original object. Many of the most useful object interactions have been catalogued. These object interactions are commonly referred to as "design patterns."

A design pattern may be thought of as a solution to a recurring design problem. The recurring design problem will manifest itself in specific situations. As such, the design pattern that represents the solution conveniently allows programmer to re-use code that was previously developed and written. There are various types of design patterns. Creational design patterns create objects within a program. Structural design patterns organize discrete objects or groups of objects into a larger structure. Behavioral design patterns may define the communication between objects to control the flow in a complex computer program.

Accordingly, design Patterns are becoming increasingly popular in Object Oriented Design for solving commonly occurring design problems. Design patterns are easily used and identified in a newly developed system. However, it is not always obvious and easy to identify the design patterns that may have been used in an existing application. This difficulty arises in maintenance projects where the maintenance team did not build the application. Often, the design patterns used in the existing application were not documented by the team that built the application. As such, the maintenance team has no easy way of knowing what patterns were used to build the application. Of course, this is very important since awareness of the design patterns used in an application may help a maintenance team to better understand the implementation of the application. The team can also ensure that all future changes made to the application are in conformance to the design patterns used.

What is needed is a search technique for identifying portions of software code that have a predefined structure. This search technique should be implemented in an automated tool. One application for the automated tool is one that identifies design patterns in a source files. An automated tool that identifies design patterns in a set of JPL Source files would be particularly useful during application maintenance. An automated search tool is needed that includes a generic search engine that may be configured non-programmatically to find design patterns in JPL source code. Further, a mechanism is needed that would progressively add newer rules into the search engine to enhance the engine's ability to identify newer patterns or alternate implementations of existing patterns.

The present invention addresses the needs described above. The present invention implements a technique that identifies design patterns in source code. In one embodiment, the present invention includes an automated tool that searches for design patterns in JPL Source Files. In particular, a generic search engine may be configured non-programmatically to look through JPL source code for implementations of patterns. The present invention may be configured to specify newer implementations of patterns for the generic search engine. The present invention also provides a mechanism that progressively adds newer rules into the search engine to enhance its ability to identify newer patterns or alternate implementations of existing patterns. The present invention breaks-up the design patterns into "atomic search units." The search units may then be arranged in many different ways to specify the patterns to the search engine.

One aspect of the present invention is directed to a computerized method for identifying at least one pattern in source code. The method includes the step of parsing the source code to obtain data corresponding to at least one source code class. A plurality of search units are provided, each search unit being configured to evaluate a single verifiable property of the at least one source code class to a TRUE state or a FALSE state. At least a portion of the plurality of search units are arranged in at least one predetermined search sequence. The at least one source code class is evaluated by each search unit included in the at least one predetermined sequence to determine if the at least one pattern is identified.

In another aspect, the present invention is directed to a computerized system for identifying at least one pattern in source code. The system includes means for parsing the source code to obtain data corresponding to at least one source code class. Means for providing a plurality of search units is also provided. Each search unit is configured to evaluate a single verifiable property of a class to a TRUE state or a FALSE state. The system includes means for arranging at least a portion of the plurality of search units in at least one predetermined search sequence. Means are provided for evaluating each search unit in the at least one predetermined sequence to determine if the at least one pattern is identified.

In another aspect, the present invention is directed to a computerized system for identifying at least one pattern in source code. The system includes at least one data storage component configured to store data corresponding to at least one source code class and at least one file. The at least one file includes a plurality of search units arranged in at least one predetermined search sequence. Each search unit is configured to evaluate a single verifiable property of the at least one source code class to a TRUE state or a FALSE state. A computer system is coupled to the at least one data storage component. A search engine is configured to run on the computer system. The search engine is configured load the at least one file such that the plurality of search units evaluate the data corresponding to at least one source code class in the at least one predetermined search sequence to determine if the at least one pattern is identified.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Figure 2:
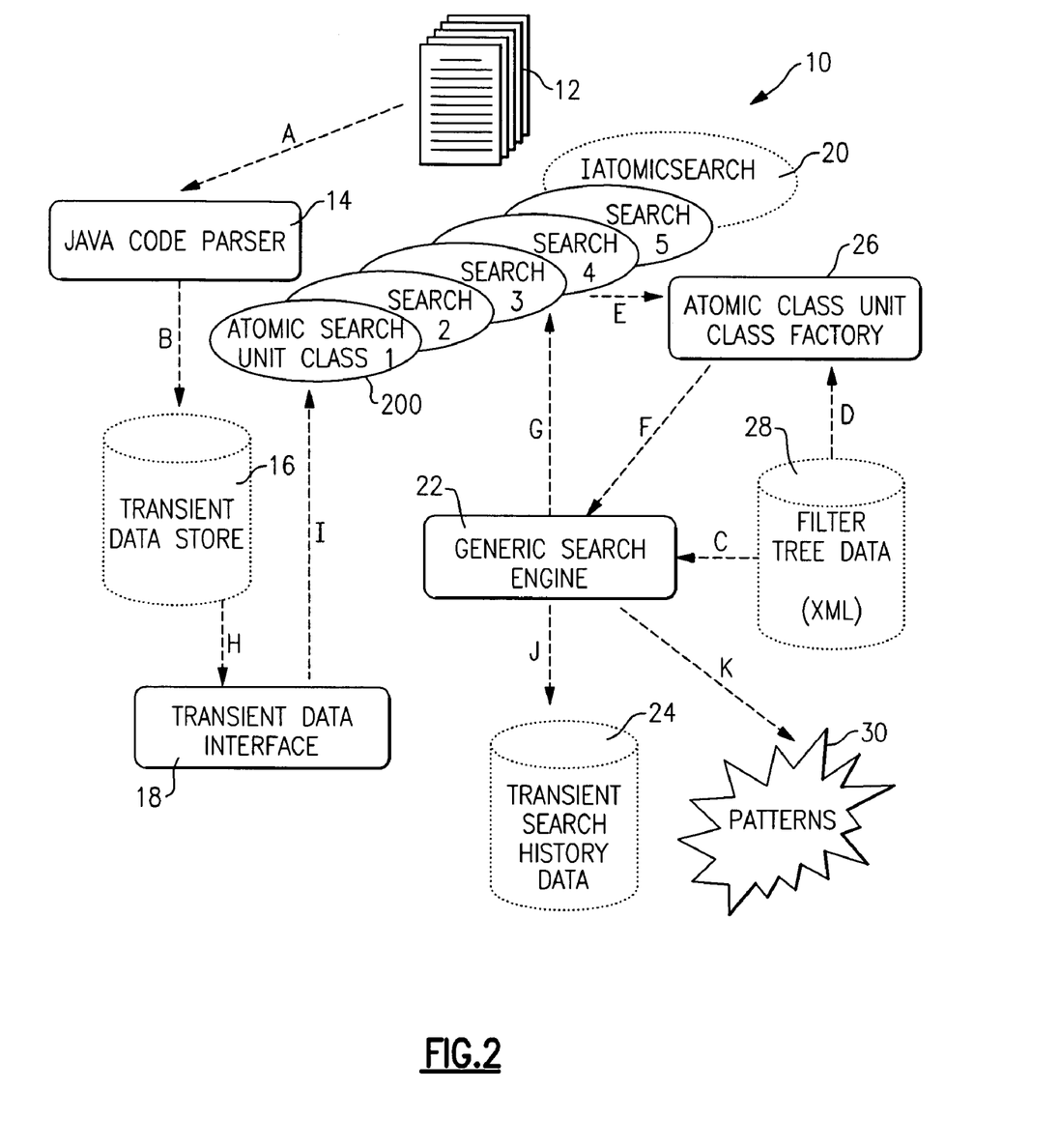
FIG. 2 is a schematic diagram of a system in accordance with one embodiment of the present invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the system for identifying design patterns in source code of the present invention is shown in FIG. 2, and is designated generally throughout by reference numeral 10.

The system and method of the present invention is based on three key concepts. These concepts include that of an atomic search unit, a search path, and a filter tree. An atomic search unit is defined as a rule that evaluates a single verifiable property of a class or a single verifiable property of the relationships between a set of classes. They can be viewed as simple non-composite rules that can be evaluated to a TRUE or FALSE state. For example, the rule "Is class abstract?" is an atomic search unit where a single property of a single class is being evaluated. Similarly, the rule "Is subclass of class X?" is an atomic search unit that evaluates the relationship of a class relative to a class X.

The search technique of the present invention organizes a given design pattern into an ordered sequence of atomic search units, or rules—the terms are synonymous, such that when the sequence is evaluated for a class or set of classes all the atomic search units in the sequence evaluate to TRUE if the class or the set of classes implement the pattern. The ordered sequence of atomic search units is defined in accordance with the present invention as a search path.

For example, a search path for a certain implementation of the Singleton Design pattern in the JPL programming language could contain the following ordered sequence of atomic search units. Each atomic search unit is given an "R" designation in the following sequences. A first search path for the Singleton Design pattern may include the following rules.

1. The class contains only a single private constructor that takes no parameters (R1).

2. The class declares a private static attribute of the same type as itself (R2).

3. The class exposes a method that returns the private static attribute (R3).

4. The method instantiates the private static attribute only once (R4).

5. No other instances of the class are created within the class (R5).

If each statement evaluates as TRUE, a Singleton Design pattern has been identified.

As those of ordinary skill in the art will understand, every design pattern could have multiple ways in which it is implemented in code; each specified using a different search path. Thus a search path for a second implementation of the Singleton pattern may be implemented as follows.

The class contains only a single private constructor that takes no parameters (R1).

The class declares a private static attribute of the same type as itself (R2).

The private static attribute is initialized at declaration with an instance of the class (R6).

The class exposes a method that returns the private static attribute (R3).

No other instances of the class are created within the class (R5).

Again, if each statement evaluates as TRUE, a Singleton Design pattern has been identified. Accordingly, a filter tree may be created by putting together search paths for one or more patterns in a single tree.

Figure 1:
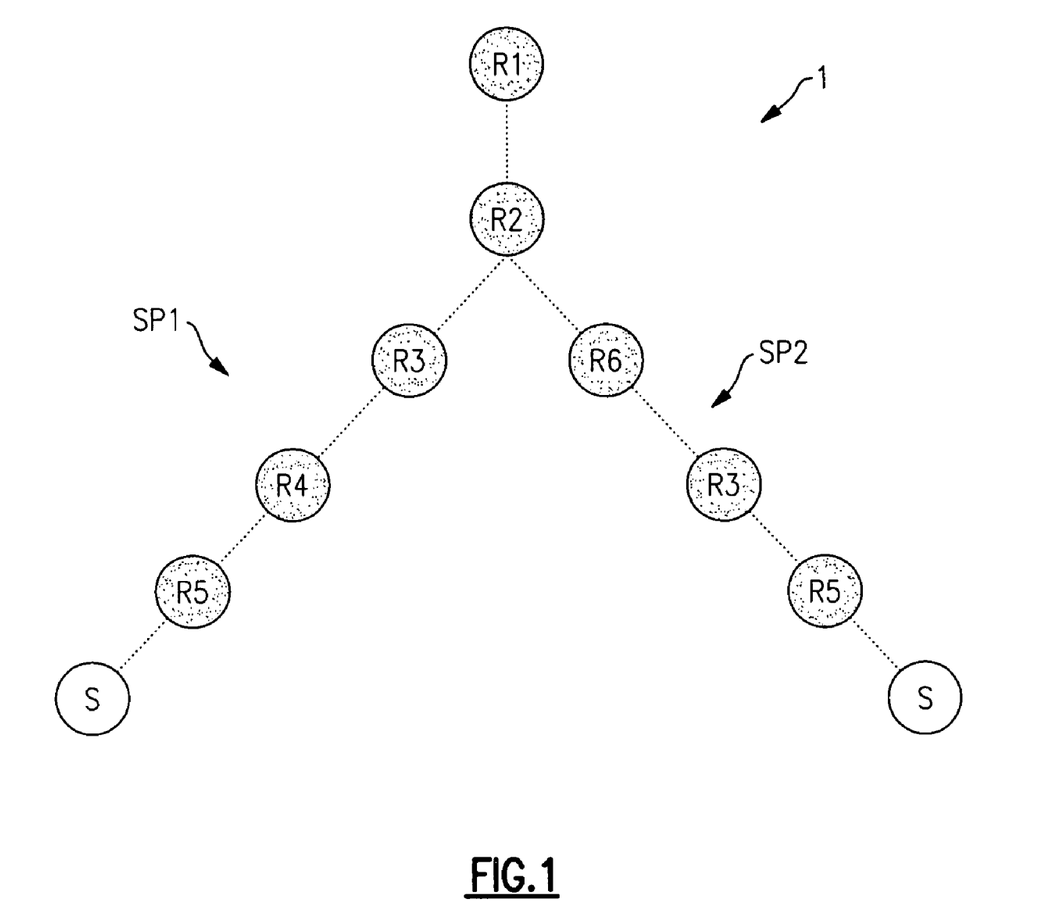
FIG. 1 is a diagram of a filter tree in accordance with the present invention.

FIG. 1 is a diagram of a filter tree that incorporates the Singleton pattern search paths shown above. The atomic search units (R) for the first two steps are the same for both paths. However, the second Singleton implementation includes R 6, R 3, and R 5 in sequence. Accordingly, filter tree 1 will search for both implementations of the Singleton pattern. To enable the creation of a single filter tree consisting of search paths for all the design patterns, including those search paths that do not have a common start node, it is essential to introduce an atomic search unit as the root node in the filter tree that satisfies all the design patterns. One such atomic search unit could have the rule "Is a class?," which means that an entity participating in a pattern is a class.

The capability to search for a new design pattern or a new implementation for an existing design pattern can be added by specifying an equivalent search path in the filter tree. The filter tree itself could be stored in a file or any other external data source using a pre-defined format for example XML. This would allow for new search paths to be added non-programmatically. The search engine that evaluates the rules could load the filter tree from the external data source thus allowing the engine to be generic.

Referring back to FIG. 1, the leaf nodes in the tree hold the name of a pattern. The letter 'S' in the leaf nodes indicates the Singleton pattern. If all the atomic search units along a search path in the filter tree evaluate to TRUE for a class or a set of classes, the leaf node would provide the name of the pattern implemented by the class or set of classes.

The key steps in the search technique provided by the present invention are as follows. First, the atomic search units for a specific implementation of a design pattern must be identified. The atomic search units are then sequenced in accordance with an implementation of the pattern to thereby define a search path for the pattern. The first two steps are repeated for different patterns or for different implementations of the same pattern. Next, a filter tree is created by incorporating all of the tree paths previously defined. A dummy root node is defined for the filter tree if the search paths do not have a common start node. The dummy node should always evaluate to TRUE. The filter tree is then captured in the extensible markup language (XML) file format. The XML filter tree data, and the classes to be evaluated, are provided as inputs to a generic search engine. The engine evaluates the filter tree rules (Rs) for the selected classes to determine the implemented patterns.

As embodied herein, and depicted in FIG. 2, a schematic diagram of a system 10 in accordance with one embodiment of the present invention is disclosed. System 10 includes source code files 12. In one embodiment, the source files 12 are JPL source code files for the classes that are to be searched to determine if they implement any design patterns. Source files 12 are coupled to code parser 14. In the example shown in FIG. 2, the parser is a JPL code parser. Those skilled in the art will recognize that the present invention should not be construed as being limited to JAVA brand programming language code applications. However, in the example provided in FIG. 2, JPL code parser 14 is configured to parse JPL Source Code files to thereby extract relevant data. The data is written to transient data store 16.

The transient data store is used to store the data that is extracted from the JPL source files 12 by the JPL code parser 14. As the component name suggests this data is transient and is discarded when the application terminates.

The transient data interface 18 provides an Application Program Interface (API) that is used by the Atomic Search Unit Class Library 20 to evaluate the rules encapsulated by them. The transient data interface 18 uses the output from the JPL Code parser to provide utility functions. These utility functions can be used to retrieve specific properties of the JPL classes being searched. They can also be used to retrieve specific properties of the relationships between these classes. For example, the transient data interface 18 exposes methods that return all the interfaces implemented by a class or the super class of a class.

The transient data interface 18 has been introduced so that each individual atomic search unit class 200 does not have to parse JPL code to evaluate the rule encapsulated by it. The parsing of the JPL source files and the interpretation of the parsed data has been abstracted out in the JPL Code Parser 14 and the Transient Data Interface 18 respectively. This greatly simplifies the implementation of the atomic search unit classes 200. Each atomic search unit class 200 only needs to access the interpreted data to evaluate the rules they encapsulate.

As noted above, an atomic search unit is defined as a rule for evaluating one step in a design pattern sequence. In FIG. 1, each atomic search unit is designated as R1, R2, R3, and etc. Each rule is implemented, or developed, as a class. Each class employs a pre-defined interface referred to as the "IAtomicSearch." When a new atomic search unit is added to implement a new rule that is required for a design pattern evaluation, a new class 200 is added to library 20. Of course, the new class implements the interface IAtomicSearch.

The interface IAtomicSearch exposes a method that is invoked by the generic search engine. The method only evaluates one rule. For example, the method may evaluate whether "the class contains only a single private constructor that takes no parameters (R1)." As noted briefly above, each one of the classes 200 is responsible for evaluating the rule encapsulated within in accordance with the data passed to them by the generic search engine. An atomic search unit library 20 allows previously defined atomic search unit classes 200 to be re-used repeatedly. As such, when the atomic search units for a specific implementation of a design pattern are identified, the previously defined atomic search units are selected from library 20 for a different implementation of the same pattern or for an implementation of an entirely different design pattern. Again, each atomic search unit class encapsulates a single rule. These classes are invoked by the Generic Search Engine in accordance with the XML filter tree 28. The data required to evaluate the rules is passed to the atomic search unit class 200 by the Generic Search Engine 22. Additionally, the atomic search unit classes 200 may invoke the methods exposed by the Transient Data Interface to retrieve specific properties for a class or its relationships to other classes.

An Atomic Search Unit Class Factory 26 is responsible for generically creating instances of the Atomic Search Unit Classes, i.e. an Atomic Search Unit Object. It exposes a method that takes in the logical name of an Atomic Search Unit and returns an instance of the class (object) that encapsulates the rule for the Atomic Search Unit. The Filter Tree Data 28 contains a mapping between the logical names of the Atomic Search Units and the Atomic Search Unit classes 200 that implement the rule validation logic. The Atomic Search Unit Class Factory 26 component uses this data to determine which class to instantiate when a logical name of an Atomic Search Unit is passed to it.

The Generic Search Engine 22 is the component that controls the search process. It makes use of the atomic search unit classes 200, the Filter Tree data 28 and the Transient Search History Data 24 to look for patterns in the JPL source code files. It uses the Filter Tree Data 28 to sequence the search in the manner described in FIG. 1 and the related text.

The Filter Tree Data 28 component holds the XML representation of the Filter Tree. The Filter Tree is cached in memory to enhance performance. This component provides interfaces that allow the invoker to traverse through the filter tree. The filter tree data component also contains data for the Atomic Search Unit classes. This data is used by the Atomic Search Unit class factory to generically instantiate the Atomic Search Unit Classes.

Transient Search History Database 24 holds the transient data that is generated during a search. It maintains the history for each of the classes being searched for a pattern. As the search engine moves along the tree nodes evaluating the rules it updates the Transient Search History Data with the results at each node. This data is eventually used to determine if a class or set of classes has satisfied a pattern.

The Patterns Output component 30 includes the patterns that have been identified as being present in the classes derived from the searched source files. The output that is displayed to the user consists of the name of the patterns found, the names of the classes participating in each of the patterns and the role played by each class in the pattern.

The present invention may run on any suitable computer system. The computer system may typically include at least one processor coupled to a bus system. The bus is configured to provide address, data, and control signaling information between the processor and other system components. The computer system typically includes random access memory (RAM) or other dynamic storage devices coupled to the bus system. As those of ordinary skill in the art will recognize, RAM is typically used to store data and instructions for execution by the processor(s). RAM may also be used for storing temporary variables or other intermediate information during execution of instructions by the processor(s). As noted above, the computer system may employ RAM or cache memory to store the filter tree for fast access. The computer system typically includes some form of read only memory (ROM), or other such static storage devices, coupled to the bus system. Of course, ROM (EROM EPROM E$^2$PROM, etc.) is configured to store static information and instructions for use by the processor(s). Other storage devices such as a magnetic disk system or an optical disk system, may be coupled to the bus for persistently storing information and instructions.

As noted above, the pattern output results are provided to a user. Accordingly, the computer system is typically coupled to a user interface having a display, such as a cathode ray tube (CRT), liquid crystal display, active matrix display, or plasma display, for displaying information to the user. The user interface typically includes one of more input devices such as a keyboard having alphanumeric and other keys, for communicating information and command selections to the processor(s). The user interface may include a cursor control, such as a mouse, a trackball, or cursor direction keys, for communicating direction information and command selections to the processor(s) and for controlling cursor movement on the display.

In any distributed computing environment, the computer system includes one or more communication interfaces. The communication interface provides a two-way data communication between the computer system and an external network and/or device. As such, the communication interface may be a digital subscriber line (DSL) card or modem, an integrated services digital network (ISDN) card, a cable modem, a telephone modem, a local area network (LAN) card (e.g. for Ethernet™ or an Asynchronous Transfer Model (ATM) network) to provide a data communication connection to a compatible LAN, or any other communication interface configured to provide a data communication connection to a corresponding type of communication line. For example, the communication interface may implement a wireless link. In any such implementation, communication interface sends and receives electrical, electromagnetic, or optical signals that carry digital data streams representing various types of information.

The communication interface may include peripheral interface devices, such as a Universal Serial Bus (USB) interface, a PCMCIA (Personal Computer Memory Card International Association) interface, etc.

The term "computer-readable medium" as used herein refers to any medium that participates in providing data and/or instructions to the processor for execution. Such a medium may take many forms, including but not limited to non-volatile media, volatile media, and transmission media.

Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Figure 3:
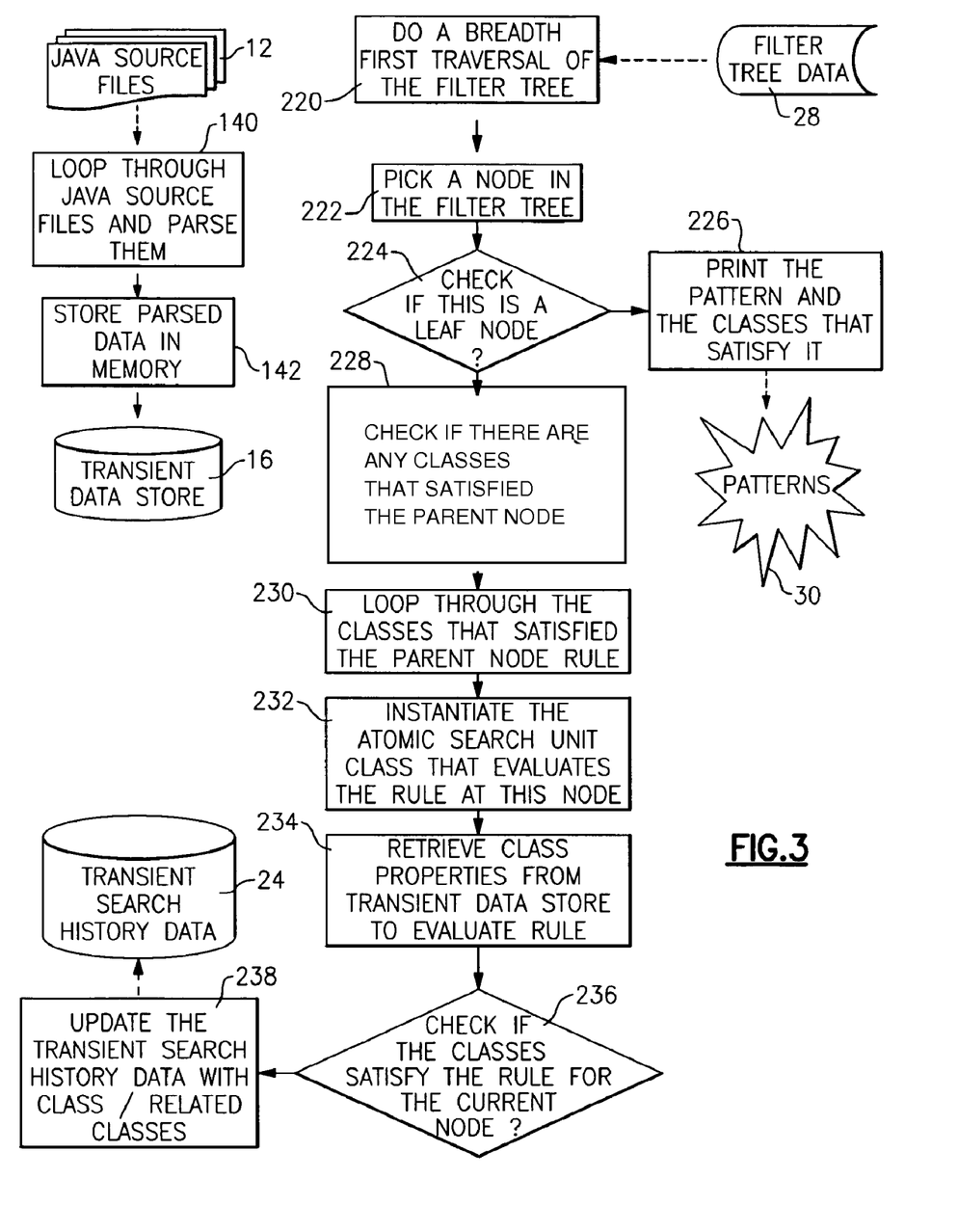
FIG. 3 is a flow chart showing a technique for searching for design patterns in source code.

As embodied herein, and depicted in FIG. 3, a flow chart showing a technique for searching for design patterns in source code is disclosed. As shown in FIG. 3, the flowchart includes steps with reference numbers 12, 140, 142, 16, 24, 238, 220, 222, 224, 228, 230, 232, 234, 236, 226, 30. The search algorithm described herein may be viewed as a kind of filtering algorithm where each atomic search unit along a search path in the filter tree is a filter that allows only a class or a set of classes to pass through while filtering the rest. The classes that pass through a specific atomic search unit depends on the rule that is encapsulated within that atomic search unit. A class or set of classes satisfying the rule is akin to passing through a filter. Thus a search path can be viewed as a series of filters through which a class or set of classes should pass to satisfy a pattern.

The search for any pattern begins with a single class. Each class whose source code is provided to the search engine is passed through the filter tree to determine if it plays a role in any pattern. The Transient Search History Data is used to keep track of the search results as the classes are passed through the filter tree. If a class (or set of classes) fails to satisfy the rule at a particular node of the filter tree it is not considered any further along the search paths that originate from this node. However, the same class (or set of classes) may continue to be evaluated along a different search path.

In steps 140, 142, the JPL code parser parses the source files received from source 12 to obtain meta data contained in the source files. The meta data includes information corresponding to characteristics of the classes, such as member variable data, access modifiers, arguments to methods, and other such data. The data may include names of methods, classes, super-classes, and sub-classes. The meta data corresponding to the class or classes are subsequently stored in data store 16.

In step 220, the search engine traverses the filter tree in a breadth first manner. A breadth-first search is a tree search algorithm used for traversing or searching a tree, tree-structure or graph. The search engine 22 begins at the root node of the filter-tree and then evaluates all the neighboring nodes. Subsequently, the search engine evaluates the neighbor nodes of the nodes previously evaluated, and so on until all the nodes have been evaluated. A breadth-first search is an uninformed search method that aims to expand and examine all nodes of a tree systematically in search of a solution. In other words, it exhaustively searches the entire tree without considering the goal until it finds it. In other words, a breadth-first search does not care if the pattern being evaluated is a Singleton design pattern.

In step 220, the search engine traverses the filter tree in a breadth first manner. A breadth-first search is a tree search algorithm used for traversing or searching a tree, tree-structure or graph. The search engine 22 begins at the root node of the filter-tree and then evaluates all the neighboring nodes.

Subsequently, the search engine evaluates the neighbor nodes of the nodes previously evaluated, and so on until all the nodes have been evaluated. A breadth-first search is an uninformed search method that aims to expand and examine all nodes of a tree systematically in search of a solution. In other words, it exhaustively searches the entire tree without considering the goal until it finds it. In other words, a breadth-first search does not care if the pattern being evaluated in a Singleton design pattern.

Accordingly, the search engine begins with a single class and filters that class through each filter node in the tree. If all of the atomic search units along a search path in the tree evaluate to TRUE for the data corresponding to a class, or a set of classes, obtained from data store 16, then the leaf node provides the name of the pattern implemented by the class or set of classes. When this occurs, the pattern name and the classes that satisfied the pattern are written into the patterns output file 30.

In steps 228-238, search engine 22 evaluates each node in the tree to determine whether the classes satisfy a particular node. Referring to step 232, each atomic search unit is an atomic search unit class that encapsulates a rule. During the evaluation process Factory 26 (FIG. 2) must create an Object, i.e., an instance of the particular atomic search unit class, that evaluates arguments based on the class, or classes, obtained by parsing the source files 12. While every node in the tree may not evaluate to TRUE for a given class, it is helpful to track the results for each nodal evaluation. Accordingly, the transient data that is generated during a search is written into the Transient Search History Database 24. The Transient Search History Database 24 is updated as each node in the tree is evaluated. As such, the database 24 maintains a history for each of the classes being searched. This data is eventually used to determine if a class or set of classes has satisfied a pattern.

Figure 4:
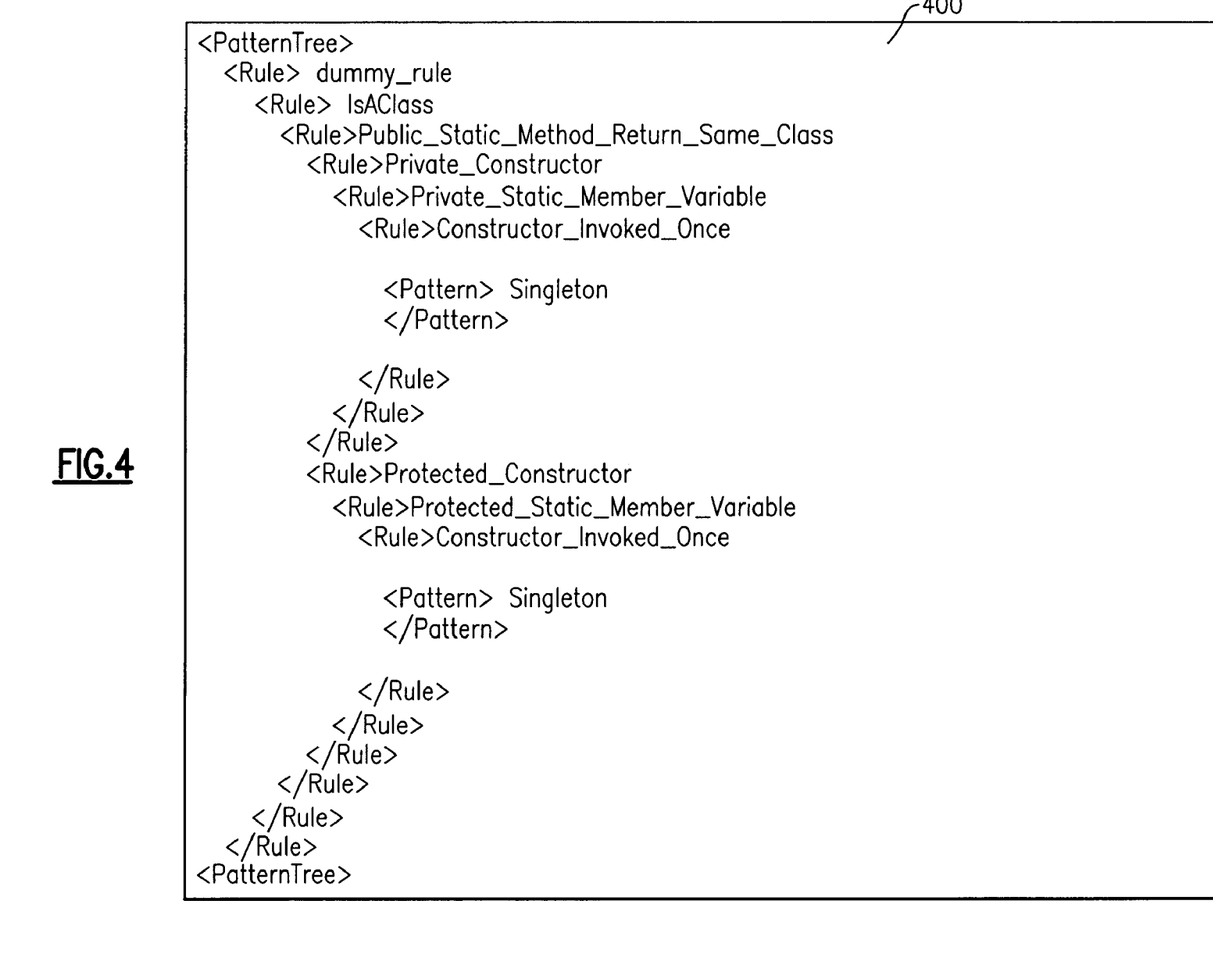
FIG. 4 is a sample XML file implementing a pattern tree with two search paths.

Referring to FIG. 4, a sample XML file 400 that implements a pattern tree with two search paths is shown. In this case, file 400 includes the filter tree data shown in FIG. 1 as an XML flat file. The XML data for the filter tree can be split into two parts. The first part contains the specifications of the atomic search units. The second part makes use of these atomic search units to define the search paths that make up the filter tree. Together they provide the Generic Search Engine with all the data that it needs to perform the search. The following sample shows the XML specification of a pattern tree with two search paths.

Figure 5:
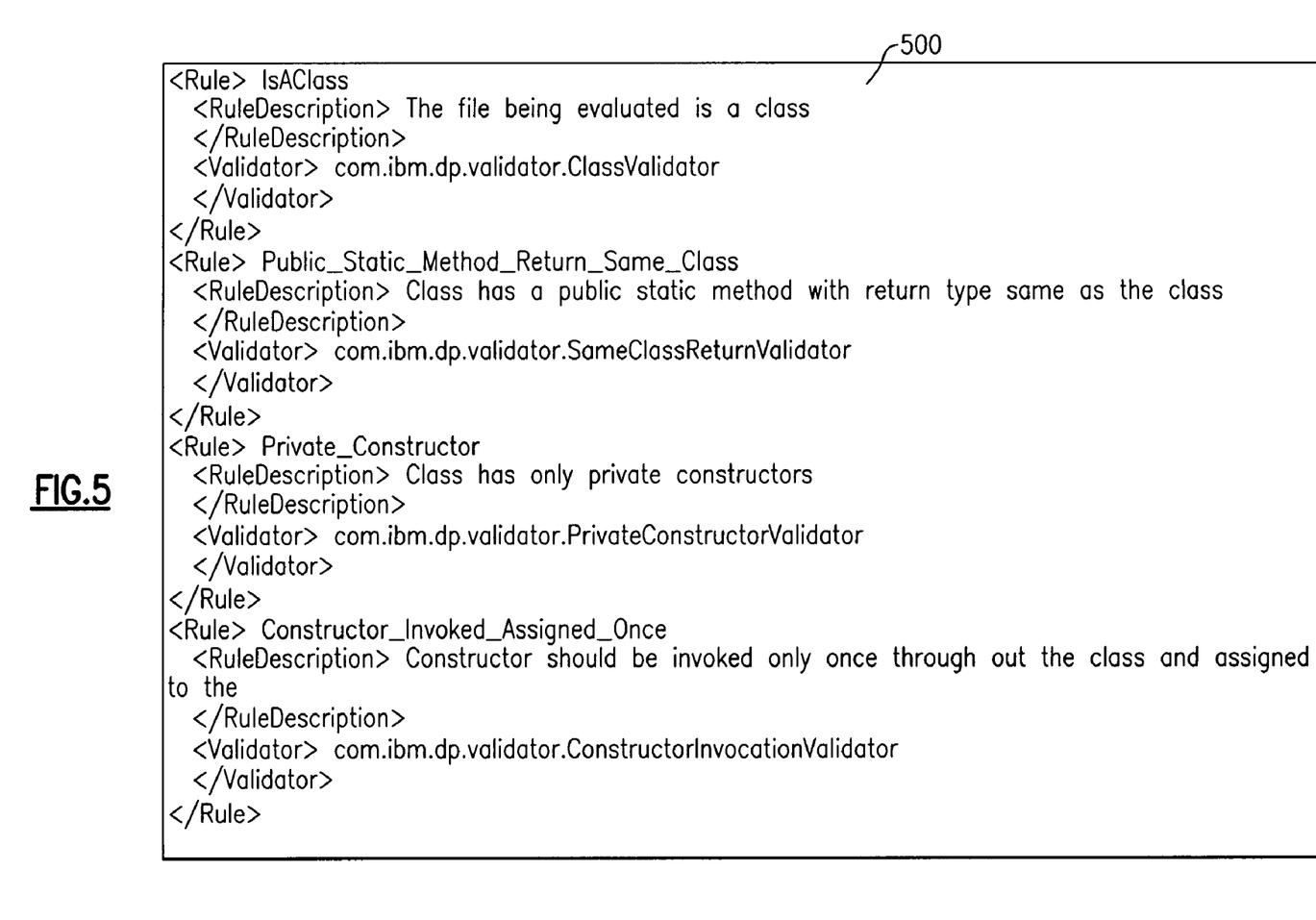
FIG. 5 is a sample XML file that defines atomic search units.

Referring to FIG. 5, a sample XML file 500 that defines atomic search units is shown. The figure shows a sample XML specification of the atomic search units. The XML contains the fully qualified names of the classes that implement the search units. The Atomic Search Unit Class Factory component uses this class name to create an instance of the Atomic Search Unit Class, i.e., an Object, that is given the name of the rule.

Figure 6A:
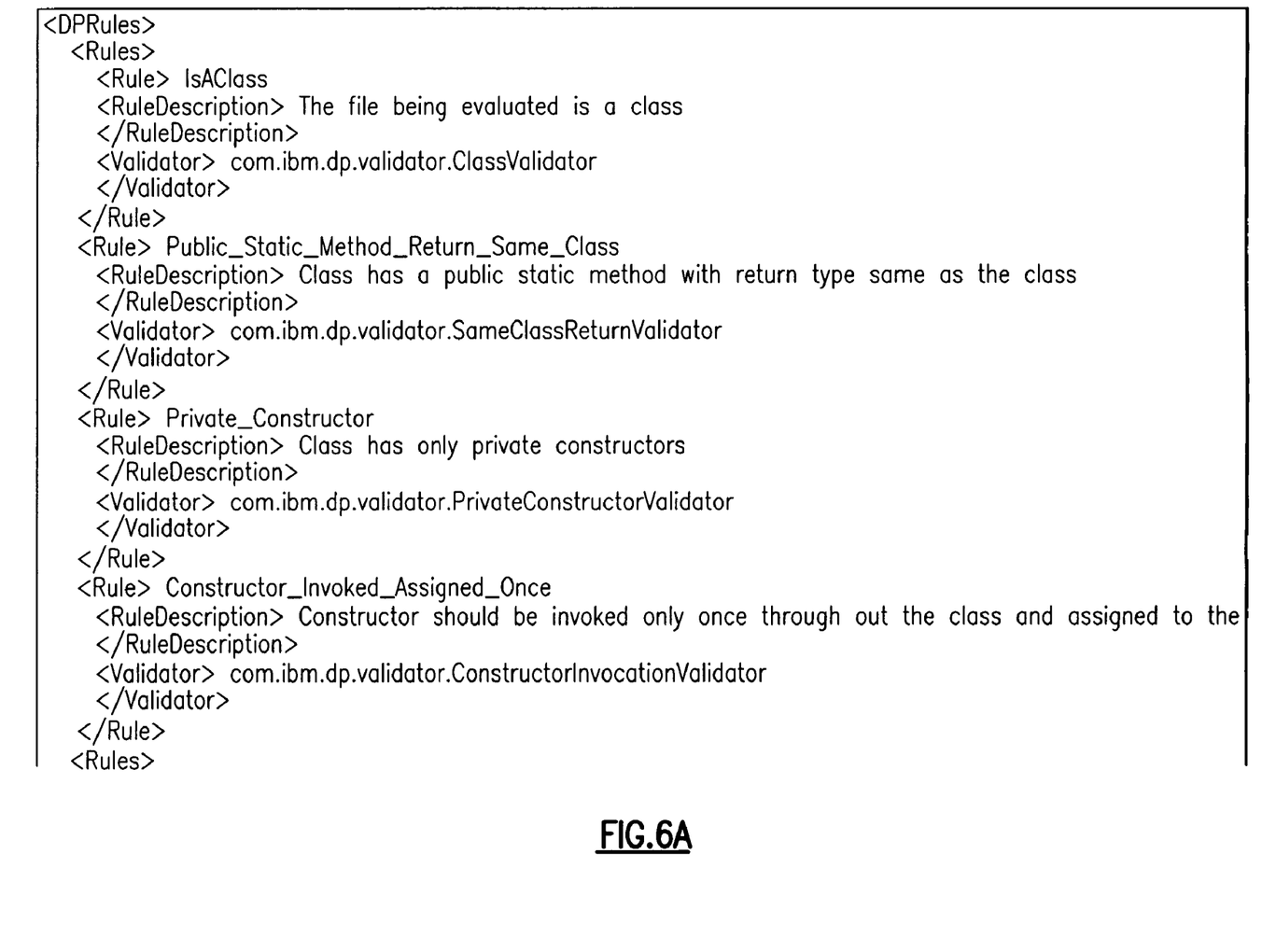
FIGS. 6A and 6B collectively is a sample XML file that shows atomic search units and a pattern tree in a single file.
Figure 6B:
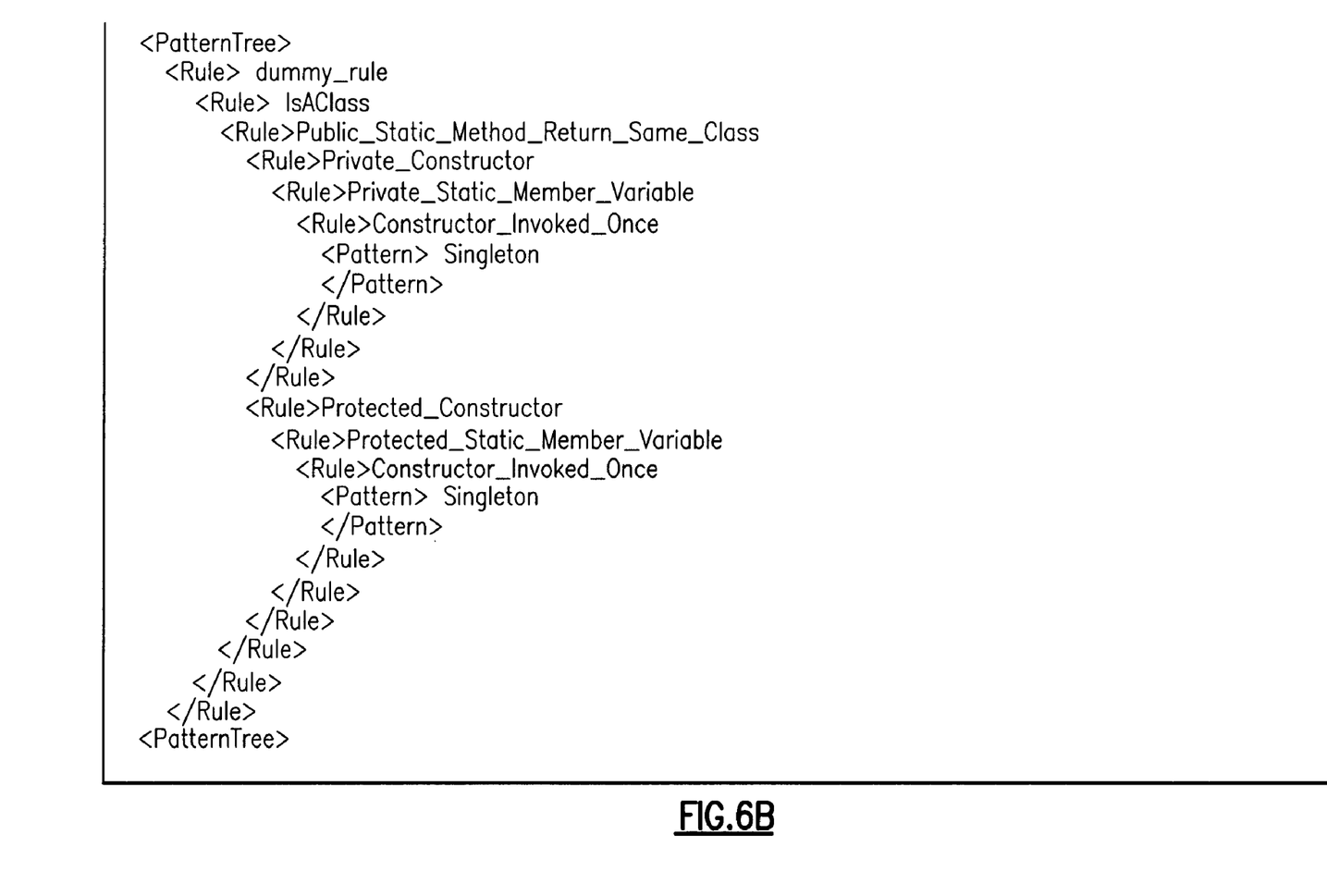

The effectiveness of the search depends on how well the atomic search units have been defined and chained to form a search path for a specific pattern. The present invention allows the atomic search units and search paths to be easily updated without affecting the core search engine 22. Those of ordinary skill in the art will understand that the rules encapsulated in the atomic search units should be defined a bit conservatively such that the engine does not incorrectly detect patterns that do not really exist in source code. FIGS. 6A and 6B collectively is a sample XML file that shows atomic search units and a pattern tree saved in a single file.

EXAMPLES

The invention will be further clarified by the following examples which are intended to be exemplary of the invention. The following recipes are examples of atomic search units for some of the commonly known design patterns. Please note that in all cases only one of the many possible search paths has been specified.

Example 1

Singleton

The class contains only a single private constructor that takes no parameters.

The class declares a private static attribute of the same type as itself.

The class exposes a method that returns the private static attribute.

The method instantiates the private static attribute only once.

No other instances of the class are created within the class.

Example 2

Proxy

The proxy class delegates all method calls to another class via an instance of the type of the class.

The proxy class has a private or protected attribute that is of the type of the class for which it is a proxy.

The method signatures of the proxy class and the class for which it is a proxy are identical.

The proxy class and the class for which it is a proxy implement the same interface or derive from same abstract class.

The proxy class delegates the calls for all the methods in the interface or the abstract class to the class for which it is a proxy.

Example 3

Adapter

The adapter class has a private or protected attribute that is of the type of the adaptee class.

The method signatures of the adapter class and the adaptee are not identical.

The adapter class transforms the inputs to its methods before delegating the call to the adapter.

(Note that the adapter class delegates all method calls to another class called the adaptee, via an instance of the type of the adaptee.)

Example 4

Decorator

The Decorator class inherits from an abstract super class.

It has a private attribute that is of the type of the super class.

A concrete instance of the super class can be set to the Decorator either via a constructor or a method in the Decorator.

The decorator overrides at least one method of the super class.

In the overridden methods the Decorator delegates the calls to the private attribute of the type of the super class.

Example 5

Observer

The class implementing the Observer pattern has at least a private or protected attribute that is a collection.

The class exposes a public method that takes a single argument whose type is an interface.

The public method adds the argument to the collection attribute.

The class also exposes another public method that takes a single argument whose type is an interface.

In this public method the argument passed is removed from the collection attribute.

In at least one other method the class loops through the collection and invokes a method on the objects.

Many techniques have been proposed in the past that allow for searching of design patterns in source code. The present invention is based on a flexible approach where by it is possible to gradually build a knowledge base of different classical and non-classical implementations of design patterns. It heavily relies on specifying re-usable atomic search units that could be chained in multiple ways to search for different patterns. Having defined a sufficiently large 'pool' of such atomic search units it is possible to search for different patterns by just chaining these search units differently.

Another key feature that allows for easy extensibility is the ability to configure the atomic search units non-programmatically to the search engine via external data sources. This ensures that the search engine is capable of being enhanced without having to directly update its code.

Of course, those of ordinary skill in the art will recognize that the present invention is sufficiently generic and may be used for any application that needs to evaluate a sequence of inter-related rules on one or more entities. One such example is the search for implemented design patterns in code as discussed in this invention.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A method for identifying at least one design pattern of a source code written in an object oriented programming language, comprising the steps of:
    parsing the source code to obtain a source code data set;
    identifying a first design pattern implementation of interest; and
    defining a first set of atomic search units corresponding to the first design pattern implementation of interest;
    wherein:
        in the defining step, each of the atomic search units is defined as a question having a true-or false answer, and each of the atomic search units is configured to evaluate a single verifiable property to a TRUE or FALSE state, when applied to said source code data set corresponding to at least one source code class in said source code written in an object oriented programming language; and
        in the defining step, the atomic search units are further defined so that a respective set of true-or-false answers to the set of questions respectively defined by the set of atomic search units in a predetermined search sequence;
    evaluating the source code class by checking the questions and the TRUE and FALSE answers corresponding to the questions;
    determining, based on the evaluating results, whether or not the first design pattern implementation of interest is identified in the source code.

2. The method of claim 1, wherein the design pattern is identified as being implemented in the source code if every search unit in the predetermined sequence evaluates TRUE, the predetermined sequence including a plurality of alternate predetermined sequences, such that the at least one pattern is identified as being implemented in the source code if every search unit in the plurality of alternate predetermined sequences evaluate TRUE.

3. The method of claim 1, wherein the design pattern is not identified as being implemented in the source code if at least one search unit in the predetermined sequence evaluates FALSE.

4. The method of claim 1, wherein the design pattern is selected from a group of design patterns including a factory pattern, an abstract factory pattern, a builder pattern, a prototype pattern, a singleton pattern, an adapter pattern, a bridge pattern, a composite pattern, a decorator pattern, a facade pattern, a flyweight pattern, a proxy pattern, an observer pattern, a template pattern, a strategy pattern, a visitor pattern, a state pattern, and/or a command pattern.

5. The method of claim 1, wherein the step of evaluating is performed by doing a breadth-first traversal of the predetermined sequence.

6. A computerized system for identifying design pattern in a set of source code written in an object oriented programming language, the system comprising:
    means for parsing the source code to obtain source code class data corresponding to a source code class within the set of source code, the source code class is stored in a data storage;
    means for identifying a first design pattern implementation of interest;
    means for providing a plurality of atomic search units corresponding to the first design pattern implementation of interest, each of the atomic search units is defined as a question having a true or false answer, and each of the atomic search unit being configured to evaluate as TRUE or FALSE, a respective verifiable property of the source code class data;
    means for arranging the plurality of atomic search units in a predetermined search sequence so that an evaluation of the plurality of atomic search units in the predetermined sequence can be used to determine the presence of the design pattern;
    means for evaluating the source code class data by each atomic search unit in the predetermined sequence to obtain the TRUE/FALSE status of the verifiable properties corresponding to the plurality of atomic search units included in the predetermined search sequence; and
    means for determining if the design pattern implementation of interest is identified based on the evaluations made by the means for evaluating.

7. The system of claim 6, wherein the means for evaluating identifies the design pattern as being implemented in the source code if every search unit in the predetermined sequence evaluates TRUE, the predetermined sequence including a plurality of alternate predetermined sequences, such that the at least one pattern is identified as being implemented in the source code if every search unit in the plurality of alternate predetermined sequences evaluate TRUE.

8. The system of claim 6, wherein the means for evaluating identifies the pattern as being not implemented in the source code if at least one search unit in the at least one predetermined sequence evaluates FALSE.

9. The system of claim 6, wherein each search unit of the plurality of search units is defined as a class in an Object-Oriented programming language such that the plurality of search units includes a plurality of classes.

* * * * *